US008231831B2

(12) United States Patent
Hartzell et al.

(10) Patent No.: US 8,231,831 B2
(45) Date of Patent: *Jul. 31, 2012

(54) MICRO-PIXELATED FLUID-ASSAY STRUCTURE

(75) Inventors: John W. Hartzell, Camas, WA (US); Pooran Chandra Joshi, Vancouver, WA (US); Paul J. Schuele, Washougal, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 950 days.

This patent is subject to a terminal disclaimer.

(21) Appl. No.: 11/827,174

(22) Filed: Jul. 10, 2007

(65) Prior Publication Data

US 2008/0084372 A1 Apr. 10, 2008

Related U.S. Application Data

(60) Provisional application No. 60/849,875, filed on Oct. 6, 2006.

(51) Int. Cl.
*G01N 21/00* (2006.01)

(52) U.S. Cl. ....... 422/82.05; 422/62; 422/129; 422/400; 385/12; 385/129; 435/6; 435/287.1; 435/288.1; 356/314; 356/440; 506/9

(58) Field of Classification Search ........................ None
See application file for complete search history.

(56) References Cited

U.S. PATENT DOCUMENTS

| | | | | |
|---|---|---|---|---|
| 5,143,854 | A | 9/1992 | Pirrung et al. | |
| 5,514,501 | A | 5/1996 | Tarlov | |
| 6,093,302 | A | 7/2000 | Montgomery | |
| 6,197,503 | B1 | 3/2001 | Vo-Dinh et al. | |
| 6,280,595 | B1 | 8/2001 | Montgomery | |
| 6,403,317 | B1 * | 6/2002 | Anderson | 435/6 |
| 6,551,784 | B2 | 4/2003 | Fodor et al. | |
| 6,605,796 | B2 | 8/2003 | Brandinger et al. | |

(Continued)

FOREIGN PATENT DOCUMENTS

| | | |
|---|---|---|
| JP | 3447055 | 4/2003 |

(Continued)

OTHER PUBLICATIONS

Arntz et al. 2003. "Label-free protein assay based on a nanomechanical cantilever array." *Nanotechnology*. 14:86-90 (5 pp).

(Continued)

*Primary Examiner* — Sally Sakelaris
(74) *Attorney, Agent, or Firm* — David C. Ripma, Esq.; Jon M Dickinson, Esq.

(57) ABSTRACT

A pixel-by-pixel digitally-addressable, pixelated, fluid-assay, active-matrix micro-structure including plural pixels formed preferably on a glass or plastic substrate, wherein each pixel, formed utilizing low-temperature TFT and Si technology, includes (a) at least one functionalized, digitally-addressable assay sensor including at least one functionalized, digitally-addressable assay site which has been affinity-functionalized to respond to a selected, specific fluid-assay material, and (b) disposed operatively adjacent that sensor and its associated assay site, digitally-addressable and energizable electromagnetic field-creating structure which is selectively energizable to create, in the vicinity of the sensor and its associated assay site, a selected, ambient, electromagnetic field environment which is structured to assist, selectively and optionally only, in the reading-out of an assay-result response from the assay sensor and assay site.

3 Claims, 5 Drawing Sheets

U.S. PATENT DOCUMENTS

| | | | | |
|---|---|---|---|---|
| 6,794,052 | B2 | 9/2004 | Schultz et al. | |
| 6,860,939 | B2 * | 3/2005 | Hartzell | 117/43 |
| 6,985,655 | B2 | 1/2006 | Yamamoto | |
| 7,125,451 | B2 | 10/2006 | Hartzell | |
| 7,128,783 | B2 | 10/2006 | Hartzell | |
| 7,135,070 | B2 | 11/2006 | Hartzell | |
| 7,156,916 | B2 | 1/2007 | Hartzell | |
| 7,163,822 | B2 | 1/2007 | Yazawa et al. | |
| 2003/0035109 | A1 | 2/2003 | Hartwich et al. | |
| 2003/0219196 | A1 * | 11/2003 | Weng et al. | 385/17 |
| 2005/0063870 | A1 * | 3/2005 | Fukushima et al. | 422/82.05 |
| 2007/0072169 | A1 | 3/2007 | Peyvan et al. | |

FOREIGN PATENT DOCUMENTS

| | | |
|---|---|---|
| JP | 2003-322613 | 11/2003 |
| JP | 2004-001200 | 8/2004 |
| JP | 2006-17706 | 1/2006 |
| JP | 2006-504111 | 2/2006 |
| WO | WO 9210092 | 6/1992 |

OTHER PUBLICATIONS

Jacobson et al. 1985. "Functionalized Congeners of Adenosine: Preparation of Analogues with High Affinity for $A_1$-Adenosine Receptors" *J. Med. Chem.* 28:1341 (1 p, abstract only).

McGall, et al., Jun. 4, 1997, *Journal of the American Chemical Society*, 119(22).

Noda et al. "Development of Photolithography System with Liquid Crystal Device as Active Mask for Synthesizing DNA Chips", Proceedings of the Japan Society of Mechanical Engineers, Kanto Branch, the Japan Society for Precision Engineering, Ibaraki Conference, 2003, vol. 2003, p. 201-202. Japan.

USPTO Office Action, U.S. Appl. No. 11/827,173, dated Nov. 27, 2009, 14 pages total.

USPTO Office Action, U.S. Appl. No. 11/827,173, dated May 21, 2010, 9 pages total.

USPTO Office Action, U.S. Appl. No. 11/827,173, dated Dec. 8, 2010, 10 pages total.

USPTO Office Action, U.S. Appl. No. 11/827,335, dated Mar. 15, 2010, 20 pages total.

USPTO Office Action, U.S. Appl. No. 11/827,335, dated Aug. 11, 2010, 16 pages total.

USPTO Office Action, U.S. Appl. No. 11/827,175, dated Jan. 3, 2011, 13 pages total.

USPTO Office Action, U.S. Appl. No. 11/827,176, dated Jan. 3, 2011, 14 pages total.

USPTO Office Action, U.S. Appl. No. 11/888,491, dated Jun. 25, 2010, 11 pages total.

USPTO Office Action, U.S. Appl. No. 11/888,491, dated Nov. 15, 2010, 8 pages total.

USPTO Office Action, U.S. Appl. No. 11/827,173, dated Apr. 8, 2011, 11 pages total.

USPTO Office Action, U.S. Appl. No. 11/827,335, dated Apr. 12, 2011, 13 pages total.

USPTO Office Action, U.S. Appl. No. 11/827,175, dated May 31, 2011, 11 pages total.

USPTO Office Action, U.S. Appl. No. 11/827,176, dated May 31, 2011, 10 pages total.

USPTO Office Action, U.S. Appl. No. 11/888,491, dated Apr. 12, 2011, 11 pages total.

* cited by examiner

MICRO-PIXELATED FLUID-ASSAY STRUCTURE

CROSS REFERENCE TO RELATED APPLICATION

This application claims filing-date priority to currently U.S. Provisional Patent Application Ser. No. 60/849,875, filed Oct. 6, 2006, for "Micro-Pixelated Array Assay Structure and Methodology". The entire disclosure content of that prior-filed provisional case is hereby incorporated herein by reference.

BACKGROUND AND SUMMARY OF THE INVENTION

This invention relates to the field of fluid-material assays, and especially to a significantly improved assay-response, thin-film-based pixel matrix which offers a very high degree of controlled, assay-response, pixel-specific sensitivity with respect to which an assay response (a) can be output-read on a precision, pixel-by-pixel basis, and (b) can additionally be examined along uniquely accessible, special, plural and freely selectable, independent-variable "information-gathering axes", such as a time-sampling axis, and an electromagnetic-field-variable (light, heat, non-uniform electrical) axis.

Preferably, and in the above context, the invention takes the form of a relatively inexpensive, consumer-level-affordable, thin-film-based assay structure which features a low-cost substrate that will readily accommodate low-cost, and preferably "low-temperature-condition", fabrication thereon of substrate-supported matrix-pixel "components". "Low temperature" is defined herein as a being a characteristic of processing that can be done on substrate material having a transition temperature (Tg) which is less than about 850° C., i.e., less than a temperature which, if maintained during sustained material processing, would cause the subject material to lose dimensional stability. Accordingly, while the matrix-pixel technology of this invention, if so desired, can be implemented on more costly supporting silicon substrates, the preferred supporting substrate material is one made of lower-expense glass or plastic materials. The terms "glass" and "plastic" employed herein to describe a preferred substrate material should be understood to be referring also to other suitable "low-temperature materials. Such substrate materials, while importantly contributing on one level to relatively low, overall, end-product cost, also allow specially for the compatible employment, with respect to the fabrication of supported pixel structure, of low-temperature processes and methods that are based on amorphous, micro-crystal and polysilicon thin-film-transistor (TFT) technology. In particular, these substrate materials uniquely accommodate the use of the just-mentioned low-temperature TFT technology in such a way that electrical, mechanical and electromagnetic field-creating devices—devices that are included variously in the structure of the invention—can be fabricated simultaneously in a process flow which is consistent with the temperature tolerance of such substrate materials.

Regarding the preference herein for the use of low-temperature TFT technology, and briefly describing aspects of that technology, low-temperature TFT devices are formed through deposition processes that deposit silicon-based (or other-material-based, as mentioned below herein, and as referred to at certain points within this text with the expression "etc.") thin film semiconductor material (which, for certain applications, may, of course, later be laser crystallized). This is quite different from classic silicon CMOS device technology that utilizes a single-crystal silicon wafer bulk material as its semiconductor material. While the resulting TFT devices may not have the switching speed and drive capability of transistors formed on single-crystal substrates, TFT transistors can be fabricated cheaply with a relatively few number of process steps. Further, thin-film deposition processes permit low-temperature TFT devices to be formed on alternate substrate materials, such as transparent glass substrates, for use, as an example, in liquid crystal displays. In this context, it will be understood that low-temperature TFT device fabrication may variously involve the use typically of amorphous Si (a-Si), of micro-crystalline Si, and or of polycrystalline Si formed by low-temperature internal crystalline-structure processing of amorphous Si. Such processing is described in U.S. Pat. No. 7,125,451 B2, the contents of which patent are hereby incorporated herein by reference.

For the sake simply of convenience of expression regarding the present invention, and in order to emphasize the "low-temperature" formation possibility which is associated with the invention in its preferred form, all aspects of assay-matrix pixel fabrication and resulting structure are referred to herein in the context and language of "low-temperature silicon on glass or plastic" construction, and also in the context and language of "low-temperature TFT and Si technology".

Returning now to a more detailed, preliminary view of the invention, it pertains to a novel fluid-material assay matrix structure, also referred to herein as a microstructure, which takes the form of a pixelated, active-matrix, row-and-column, fluid-assay, micro-structure characterized by a selected grouping of individually electronically-digitally-addressable pixels, which pixel, and their contents, are formed preferably on a glass or plastic substrate utilizing the above-mentioned low-temperature TFT and Si technology. The concepts of digital addressability and energizing expressed herein are intended to refer to computer-controlled addressability and energizing. The pixels in this selected grouping, which may include either an entire matrix of pixels, or one of a number of possible lower-pixel-count submatrices (later to be described herein) within an overall matrix, have been appropriately prepared on a supporting substrate, with each pixel therein possessing, in addition to appropriate, relevant, computer-accessible electronic switching structure, an included assay sensor which hosts an assay site that has been affinity-functionalized to assist in the performance of a particular kind of fluid-material-specific assay.

With respect to the concept of assay-site functionalization, except for the special features enabled by practice of the present invention that relate (a) to "pixel-specific" functionalization capability, and (b) functionalization under the "control" of a "digitally energized and character-managed", "assay-site-bathing" ambient electromagnetic field of a selected nature, assay-site functionalization is in all other respects essentially conventional in practice. Such functionalization is, therefore, insofar as its conventional aspects are concerned, well known to those generally skilled in the relevant art, and not elaborated herein, but for a brief mention later herein noting the probable collaborative use, in many functionalization procedures, of conventional flow-cell assay-sensor-functional processes.

While ultimately-enabled functionalization specificity for a particular selected assay site (resident within a given pixel), in accordance with practice of the present invention in certain instances, is generally and largely controlled by ambient "bathing" of that site with selected-nature electromagnetic-field energy received from an invention-prepared, digitally-energized, appropriately positionally located electromagnetic field-creating subcomponent, it turns out that site-precision specificity is not a critical operational factor. In other words, it is entirely appropriate if the entirety of a pixel becomes ultimately "functionalized". Accordingly, terminology referring to pixel functionalization and to assay-site functionalization is used herein interchangeably.

Each pixel, which is an active-matrix pixel as that language is employed herein, also includes, as was mentioned, a special, pixel-specific, digitally and controllably energizable and employable, assay-site-bathing (also referred to as "pixel-bathing") electromagnetic field-creating structure which may be used, selectively and optionally, as a special assistant in the above-mentioned, "special-information-axis" reading-out of assay results, to generate a selected type of environmentally-pixel-bathing electromagnetic field, such as a light field, a heat field, and a non-uniform electrical field. Of course, pixel-by-pixel assay-result output reading may also be accomplished in appropriate circumstances without any use of the field-creating structure.

This interesting and unique field-creating feature of the invention, coupled with the invention's enablement of pixel-by-pixel, assay-result output reading, are what introduce and promote, among other things, the possibility of deriving assay-result data, including time-based and kinetic assay-reaction data, effectively along the above-suggested, special information axes not enabled by prior art devices. For example, and with respect to the performance, or performances, of a selected, particular type of fluid-material assay, pixels in an appropriately functionalized group of pixels may have been, before matrix delivery to a user, initially functionalized utilizing plural different intensities of functionalization-assist electromagnetic fields, such as intensity-differentiated heat and/or non-uniform electrical fields. Such differentiated field-intensity functionalization which becomes reflected in a final matrix, and which was performed by pixel-on-board electromagnetic field-creating structures, can, in an assay output-reading situation, yield information regarding how an assay's results are affected by "field-differentiated" prepared-pixel functionalization, also referred to herein as assay-site functionalization. Similarly, assay results may be observed by reading pixel output responses successively under different ambient field conditions that are then "presented" seriatim as spatial bathing fields to information-outputting pixels. Further, time-axis output data may easily be gathered on a pixel-by-pixel basis via pixel-specific, digital output sampling.

The invention thus takes the form of an extremely versatile and relatively low-cost fluid-material assay structure, which, because of its pixel-by-pixel functionalization characteristic, may be constructed, and delivered to an assay-performing user (as will be seen from discussion text presented hereinbelow) in a variety of different pre-assay conditions. A finished, user-delivered matrix structure constructed in accordance with the present invention may be delivered with all of its pixels functionalized to handle a single, specific assay. Alternatively, such a matrix structure may be delivered to a user with different pixels functionalized differently (i.e., submatrix functionalization) so as to enable a single matrix to be employed in the conducting of plural, different assays. More will be said about this "submatrix" feature of the invention later herein.

Regarding the making of a matrix micro-structure as proposed by the present invention, an important point to note is that the processes, procedures and methodologies which are employed specifically to fabricate this structure may be drawn entirely from conventional micro-array fabrication practices, such as the earlier-mentioned TFT, Si, low-temperature, and low-cost-substrate technology practices, well known to those generally skilled the art. Accordingly, the details of these practices, which form no part of the present invention, are not set forth herein. Those generally skilled in the relevant art will understand, from a reading of the present specification text, taken along with the accompanying drawing figures, exactly how to practice the present invention, i.e., will be fully enabled by the disclosure material in this application to practice the invention in all of its unique facets.

With the above having thus been said about the general nature of the present invention, the various features and advantages thereof, including those generally set forth above, will become more fully apparent as the detailed description of the invention which follows below is read in conjunction with the accompanying drawings.

DETAILED DESCRIPTION OF THE INVENTION

There is certain special terminology, other than the "low-temperature" terminology defined above, which is employed in the description and characterization of this invention, and which should here be explained.

The term "active-matrix" as used herein refers to a pixelated structure wherein each pixel is controlled by and in relation to some form of digitally-addressable electronic structure, which structure includes digitally-addressable electronic switching structure, defined by one or more electronic switching device(s), operatively associated, as will be seen, with also-included pixel-specific assay-sensor structure and pixel-bathing electromagnetic field-creating structure, also referred to herein as a pixel-internal field source structure—all formed preferably by low-temperature TFT and Si technology as mentioned above.

The term "bi-alternate" refers to a pre-created matrix condition wherein every other pixel in each row and column of pixels is commonly functionalized to possess response-affinity for one, specific type of a fluid-material assay. This condition effectively creates, across the entire area of the overall matrix of the invention, two differently functionalized submatrices of pixels (what can be thought of as a two-assay, single-matrix condition)

The term "tri-alternate" refers to a similar condition, but one wherein every third pixel in each row and column has been commonly functionalized for one, specific type of a fluid-material assay. This condition effectively creates, across the entire area of the overall matrix, three, differently functionalized submatrices of pixels (what can be thought of as a three-assay, single-matrix condition). Individual digital addressability of each pixel permits these and other kinds of matrix-distributed functionalization options, if desired.

Figure 1:
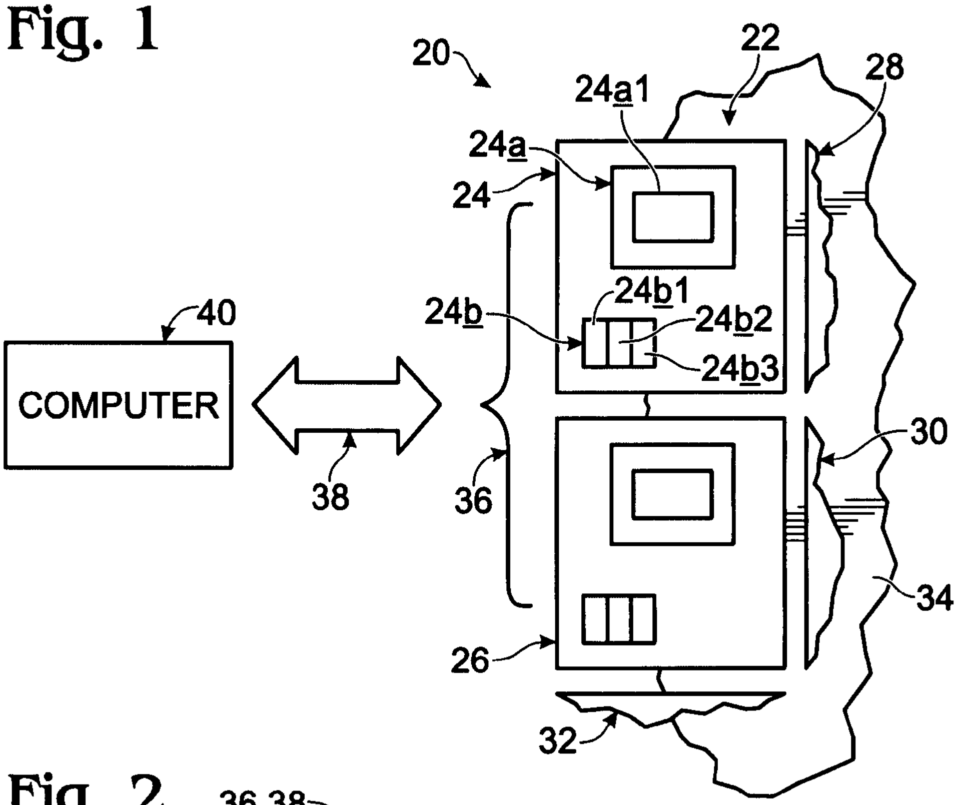
FIG. 1 is a simplified, fragmentary, block/schematic view of a portion of a digitally-addressable, pixelated, fluid-assay, active-matrix micro-structure formed in accordance with a preferred and best mode embodiment of the present invention.
Figure 2:
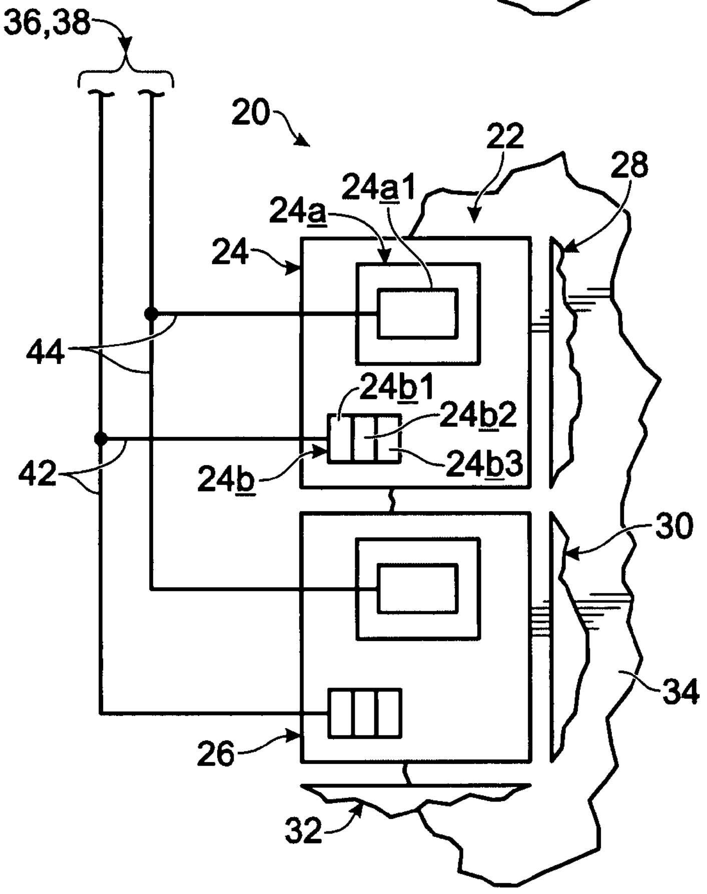
FIG. 2 is similar to FIG. 1, except that it provides a slightly more detailed view of the structure shown in FIG. 1.

Turning attention now to the drawings, and beginning with FIGS. 1 and 2, indicated generally at 20 is a fragmentary portion of a digitally-addressable, pixelated, fluid-assay, active-matrix micro-structure which takes the form herein of a column-and-row array 22 of plural, individually externally digitally-addressable pixels, such as those shown at 24, 26, 28, 30, 32, formed, as will shortly be described, on an appropriate supporting substrate 34 made of conventional-material, preferably glass or plastic. For the purpose of illustration herein, substrate 34 will be considered to be a glass substrate.

As was mentioned earlier herein, the specific low-cost and low-temperature methodologies and practices which are, or may be, utilized, in detail, to create the overall structure illustrated in FIGS. 1 and 2 are entirely conventional in nature, are well understood by those generally skilled in the relevant art, and thus may easily be practiced in well-known manners to produce the various structural aspects of micro-structure 20. For example, conventional Si-based, thin-film TFT patterning practices, such as well-known photolithographic practices, may be employed in ways that are familiar to those generally skilled in the art. Additionally, and for certain structures present in micro-structure 20, a low-temperature internal crystalline-structure processing approach may be employed to create certain desired mechanical characteristics, such as the bending characteristics of a cantilever beam like that pictured in FIG. 7, or a collection of material spikes like that shown in FIGS. 8-10C, inclusive. Such internal crystalline-structure processing methodology is fully described in U.S. Pat. No. 7,125,451 B2, and accordingly, the disclosure content of that patent is hereby incorporated herein by reference to provide background information respecting such processing methodology.

In the practice of the present invention, various non-critical dimensions may be chosen, for example, to define the overall lateral size of a micro-structure, such as micro-structure 20. Also, the number of pixels organized into the relevant, overall row-and-column matrix may readily be chosen by one practicing the present invention. As an illustration, a micro-structure, such as micro-structure 20, might have lateral dimensions lying in a range of about 0.4×0.4-inches to about 2×2-inches, and might include an equal row-and-column array of pixels including a total pixel count lying in a range of about 100 to about 10,000. These size and pixel-count considerations are freely choosable by a practicer of the present invention.

Continuing with a description of what is shown in FIGS. 1 and 2, a bracket 36 and a double-headed, broad arrow 38 (see FIG. 1) represent an appropriate communication/addressing connection, or path, between pixels in micro-structure 20 and a suitable digital computer, such as the computer shown in block form in FIG. 1 at 40. Such a path exists and is employed under circumstances where a micro-structure, such as micro-structure 20, is being (a) functionalized, or (b) "read" after the performance of a fluid-material assay. This inclusion of computer 40 in FIG. 1 has been done to help illustrate and describe the utility of the present invention.

Regarding the illustrated operative presence of a digital computer, such as computer 40, it should be understood that such a computer, while "remote and external" with respect to the internal structures of the pixels, per se, might actually be formed directly on-board substrate 34, or might truly be external to this substrate. In this context, it should be clearly understood that computer presence and/or location are not any part of the present invention.

In the particular preferred and best mode embodiment of micro-structure 20 which is illustrated in FIGS. 1 and 2, each of the mentioned pixels is essentially identical to each other pixel, although, as will later be explained herein, this is not a necessary requirement of the present invention. This "not-necessary" statement regarding the characteristics of the present invention is based upon a clear understanding that there are various end-result fluid-assay applications with respect to which appropriately functionally differentiated pixels might be fabricated in a single, micro-structure array. Some of these differentiated-pixel concepts will be discussed more fully later herein.

In general terms, and using pixel 24 as an illustration to explain the basic construction of each of the pixels shown in array 22, included in pixel 24 are several, fully integrated, pixel-specific components, or substructures. These include, as part of more broadly inclusive pixel-specific electronic structure, (1) thin-film, digitally-addressable electronic switching structure, (2) a fully assay-functionalized, individually remotely digitally-addressable and accessible assay sensor 24$a$ which hosts what was once, i.e., before functionalization, a "prospective" , functionalizable assay site 24$a_1$, and (3) what is referred to herein as a pixel-bathing, ambient environmental, preferably thin-film electromagnetic-field-creating structure 24$b$. Field-creating structure 24$b$, which is also remotely, or externally, individually digitally-addressable and accessible, is constructed to create, when energized, any one or more of three different kinds of assay-site-bathing, pixel-bathing, ambient, environmental electromagnetic fields in the vicinity of sensor 24$a$, including a light field, a heat field, and a non-uniform electrical field. While structure 24$b$, as was just mentioned, may be constructed to create one or more of these three different kinds of fields, in the micro-structure pictured in FIGS. 1 and 2, field-creating structure 24*b* has been designed with three field-creating subcomponents $\mathbf{24}b_1$, $\mathbf{24}b_2$ and $\mathbf{24}b_3$. Any one or more of these subcomponents may be energized to create, within pixel 24, an associated assay-site bathing, ambient field condition. Subcomponent $\mathbf{24}b_1$ is capable of creating a pixel-bathing light field, subcomponent $\mathbf{24}b_2$ a pixel-bathing heat field, and subcomponent $\mathbf{24}b_3$ a non-uniform pixel-bathing electrical field. More will be said about these three different kinds of field-creating subcomponents shortly.

The use of a bathing electromagnetic field of an appropriate selected character during pixel functionalization, understood by those skilled in the art, and typically used with a functionalizing flow-cell process under way, operates to create, within a pixel and adjacent an assay site, an ambient environmental condition wherein relevant chemical, biochemical, etc. reactions regarding functionalization flow material can take place, at least at the prepared, sensor-possessed assay site, or sites, to ensure proper functionalization at that site. A "prepared assay site" might typically, i.e., conventionally, be defined by a sensor borne area of plated gold.

Given the active-matrix nature of the micro-structure of the present invention, it should be understood at this point that each pixel is appropriately prepared with one or more conventional electronic switching device(s) (part of the mentioned electronic switching structure) relevant to accessing and addressing its included sensor(s) and assay site(s), and its field-creating structure. Illustrations of such switching devices are given later herein.

Looking for a moment specifically at FIG. 2, indicated generally at 42, 44 are two different communication line systems which are operatively connected, respectively, to the field-creating structures in the illustrated pixels, and to the assay sensors and assay sites shown in these pixels. The upper, fragmented ends of line systems 42, 44 in FIG. 2 are embraced by a bracket marked 36, 38, which bracket represents the previously mentioned "path" of operative connection shown to exist in FIG. 1 between micro-structure 20 and computer 40. Line system 42, which may at an earlier stage in the life of matrix 20 have been utilized by such a computer to energize field-creating subcomponents during an initial, matrix-completing, functionalization procedure, may also be used to energize these same field-creating subcomponents, where appropriate, during reading-out of the results of a performed assay. Line system 44 directly couples, on a pixel-by-pixel basis, to computer 40 assay-result output responses derived from functionalized assay sites.

Figure 3:
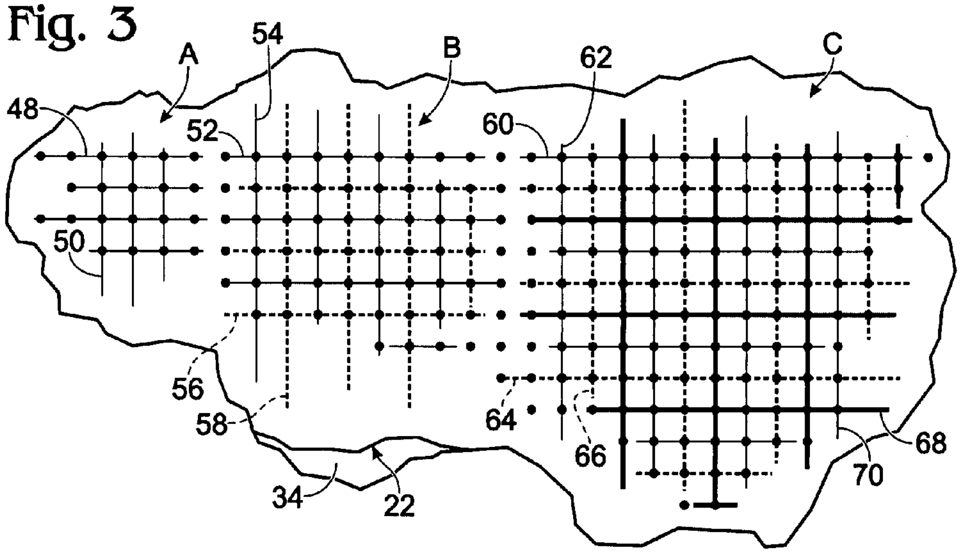
FIG. 3, which is prepared on a somewhat larger scale than those scales employed in FIGS. 1 and 2, illustrates, schematically, different, single-matrix organizational ways in which fluid-assay pixels in the matrix micro-structure of this invention may be pre-organized into different functionalized arrangements (different functionalized matrix embodiments) for different fluid-assays that are to be performed.

Having thus now described generally the arrangement and makeup of the micro-structure of this invention with respect to how that structure is illustrated in FIGS. 1 and 2, we now shift attention to FIG. 3 in the drawings. This figure illustrates several different ways in which completed-matrix, fully functionalized pixels, such as the pixels in array 22, may be initially organized, and even differentiated, prior to delivery of a matrix to a user. To begin with, the obvious, large dots, which appear throughout in a row-and-column arrangement in FIG. 3, represent the locations of next-adjacent pixels prepared in accordance with practice of this invention. One way of visualizing utilization of the invention is to recognize that every pixel thus represented by the mentioned dots may be commonly functionalized to respond to a single, specific fluid-assay material.

Regions A, B, C in FIG. 3 illustrate three other, representative, possible pixel functionalization patterns (specifically submatrix patterns) accommodated by the utility of the present invention.

In region A, which is but a small, or partial, region, or patch, of the overall matrix array 22 of pixels, a functionalized submatrix pattern has been created, as illustrated by solid, horizontal and vertical intersecting lines, such as 48, 50, respectively, including rows and columns of next-adjacent pixels, which pixels are all commonly functionalized for a particular fluid-material assay. With this kind of an arrangement, different patches, or fragmentary areas (i.e., unified lower-pixel-count submatrices defined by side-by-side pixels), of next-adjacent pixels may be differently functionalized so that a single matrix array can be used with these kinds of patch submatrices to perform in plural, different, fluid-material assays.

In region B, intersecting, solid, horizontal and vertical lines, such as lines 52, 54, respectively, and intersecting, dashed, horizontal and vertical lines, such as lines 56, 58, respectively, illustrate two, different submatrix functionalization patterns which fit each into the category mentioned earlier herein as a bi-alternate functionalization pattern which effectively creates two, large-area-distribution submatrices within the overall matrix array 22 of pixels. These two pixel submatrices are distributed across the entire area of the overall matrix array, and are characterized by rows and columns of pixels which "sit" two pixel spacings away from one another.

FIG. C illustrates another submatrix functionalization pattern wherein intersecting, light, solid, horizontal and vertical lines, such as lines 60, 62, respectively, intersecting dashed, horizontal and vertical lines, such as lines 64, 66, respectively, and intersecting, thickened, solid, horizontal and vertical lines, such as lines 68, 70, respectively, represent what was referred to herein earlier as a tri-alternate functionalization arrangement distributed over the entire matrix array 22 of pixels—effectively dividing that array into three overlapping submatrices.

Those skilled in the art, looking at the illustrative, suggested functionalization patterns illustrated in FIG. 3, will understand how these, and perhaps other, functionalization patterns interestingly tap the utility of the structure of the present invention. In point of fact, what is shown in FIG. 3 suggests that the nature of this invention offers a large, generous palette of opportunities for employing the micro-structure of this invention.

Figure 4:
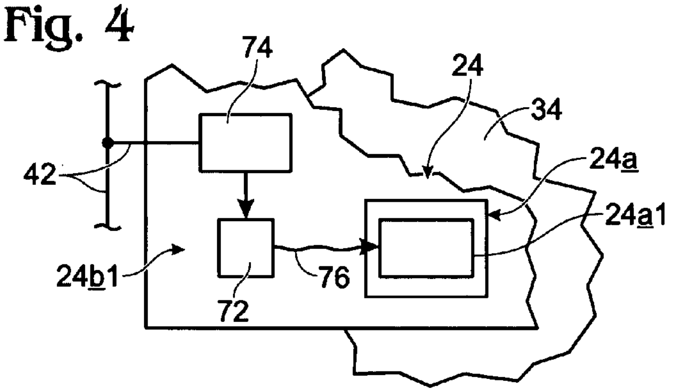
FIG. 4 is a fragmentary, block/schematic diagram illustrating one form of an electromagnetic field-creating structure (subcomponent) prepared in accordance with practice of the present invention, and specifically such a structure which is intended to create an ambient electromagnetic field environment characterized by light.
Figure 5:
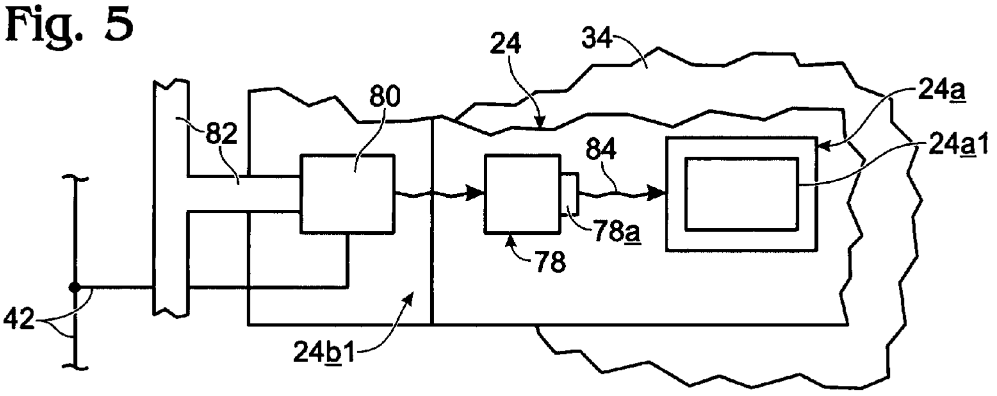
FIG. 5 is similar to FIG. 4, except that it illustrates another field-of-light-environment-creating structure (subcomponent).

Turning attention now to FIGS. 4 and 5, these two figures illustrate, schematically and fragmentarily, two different kinds of light-field-creating subcomponents. These illustrated subcomponents, with respect to what has been shown and discussed earlier herein regarding FIGS. 1 and 2, might sit at the field-creating subcomponent location which is labeled $\mathbf{24}b_1$ in FIGS. 1 and 2. FIGS. 4 and 5, in relation to the appearances of things in FIGS. 1 and 2, have been drawn somewhat differently for illustration purposes.

Thus, shown specifically in FIG. 4 is an energizable, optical medium 72 which is computer-energized/switched directly by the operation of a control transistor (an electronic switching device) shown in block form at 74. This control transistor has an operative connection to previously mentioned line system 42. A sinuous arrow 76 extends from medium 72 toward prospective assay site $\mathbf{24}a_1$ which is hosted on sensor 24*a*. Arrow 76 schematically pictures the creation of a field of light in the vicinity of site $\mathbf{24}a_1$.

In FIG. 5, an optical beam device 78, having a light output port 78*a*, is switched on and off by means of an optical switching device 80 (an electronic switching device) which is fed light through an appropriate optical beam structure 82 which in turn is coupled to an off-pixel source of light. Switching of optical switching device 80 is performed by a computer, such as previously mentioned computer 40, and via previously mentioned line system 42. A sinuous arrow 84 represents a path of light flow to create a field of light in the vicinity of prospective assay site 24$a_1$.

Figure 6:
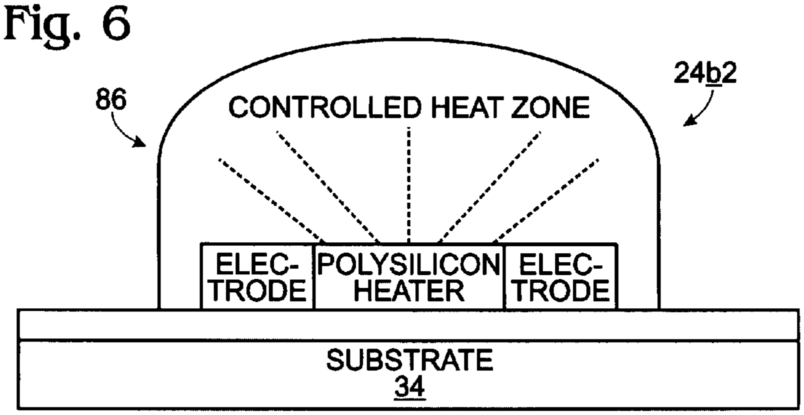
FIG. 6 provides a fragmentary, schematic illustration of one form of a heat-field-creating structure (subcomponent).

In each of the possible optical field-creating structures shown in FIGS. 5 and 6, there are different specific arrangements of optical media, well-known to those skilled in the art, which may be employed herein. For example, one such medium might have a horizontal-style configuration, and another arrangement might be characterized by a vertical-style arrangement. Such arrangements are well-known and understood by those skilled in the relevant art.

Figure 7:
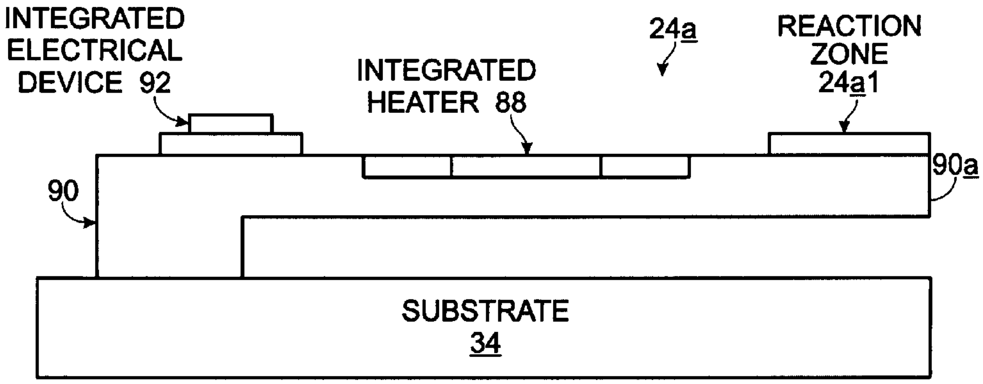
FIG. 7 illustrates fragmentarily another form of a heat-field-creating structure (subcomponent) which has been prepared on the body of a mechanical cantilever beam which also carries an electrical signaling structure that responds to beam deflection to produce a related electrical output signal.

Directing attention now to FIGS. 6 and 7, here there are illustrated, schematically, two different, electronically (computer) switchable heat-field-creating subcomponents, one of which, namely that one which is pictured in FIG. 6, may be used at the location designated 24$b_2$ in FIG. 1, and the other of which, namely that one which is shown in FIG. 7, may be used at the location of an on-sensor-24*a* site 88 which is shown only in FIG. 7. Entirely conventional and well-known, or recently introduced (above-referred-to U.S. Pat. No. 7,125,451 B2, with regard to portions of the structure shown in FIG. 7), processes may be employed to produce the switchable heat-field-creating subcomponents illustrated in these two figures.

The first-mentioned version of a heat-field-creating subcomponent is shown generally at 86 in FIG. 6. This subcomponent (86) is also labeled 24$b_2$ (in FIG. 6) in order to indicate its relationship to what has already been discussed above regarding the illustrations provided in FIGS. 1 and 2. From a brief look at the schematic illustration presented in FIG. 6, those generally skilled in the relevant art will easily recognize how to fabricate an appropriate, similar heat-field-creating organization. Accordingly, and because of the fact that many different, particular heat-field-creating arrangements may be employed, no specific details for such an arrangement are described or illustrated herein.

The heat-field-creating subcomponent version illustrated generally at 88 in FIG. 7 is one which is shown as having been formed directly adjacent assay site 24$a_1$ on a portion of assay sensor 24*a*, and specifically, formed directly on the beam 90*a* of a cantilever-type micro-deflection device 90 whose basic material body has been formed utilizing the process mentioned above referred to as internal crystalline-structure processing.

Also formed on beam 90*a* is an electrical signaling structure 92 which may take the form of any suitable electrical device that responds to bending in beam 90*a* to produce a related electrical output signal which may be coupled from the relevant pixel ultimately to an external computer, such as computer 40.

Directing attention now to FIGS. 8-10C, inclusive, these figures illustrate various aspects of an electronically (computer) switchable, non-uniform-electrical-field-creating structure 94 which may be created within a pixel, such as within pixel 24 at the site shown at 24$b_3$ in FIGS. 1 and 2. The mechanical spike structures seen in these figures have been fabricated employing the crystalline-structure-processing methodology described in the above-referred-to '451 B2 U.S. patent.

Figure 8:
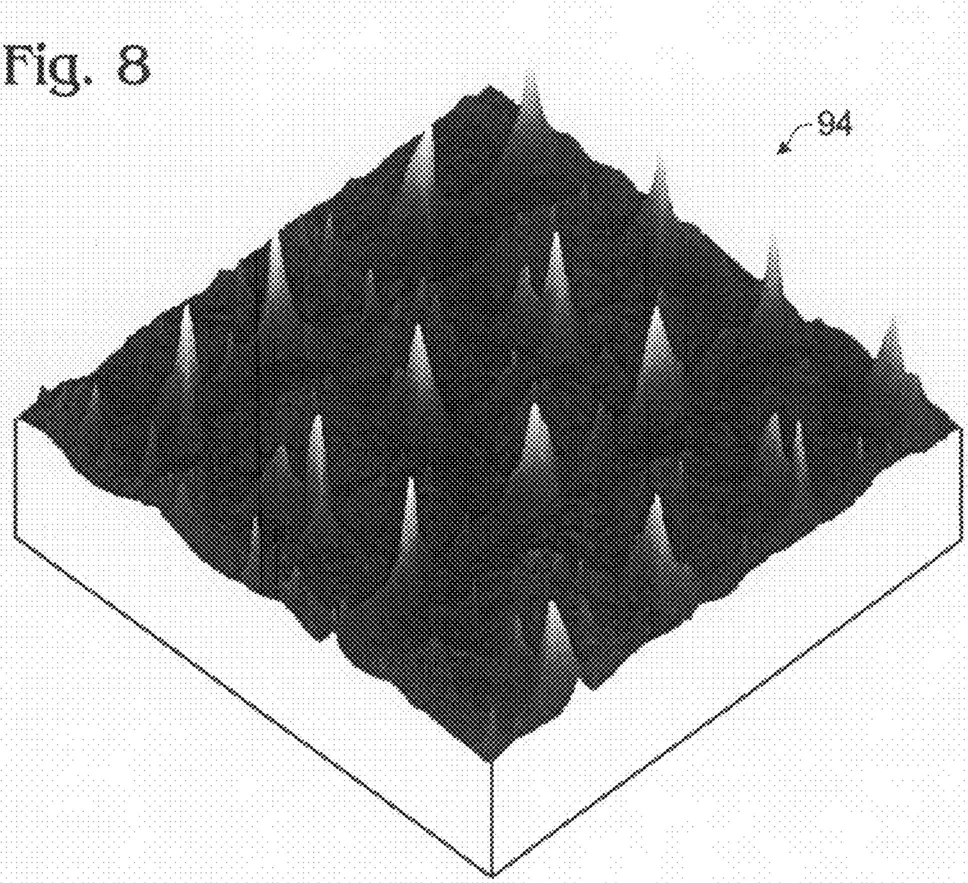
FIG. 8 is an isometric view of a non-uniform electrical-field-creating structure (subcomponent) prepared through a recently developed process, touched upon later in this specification, involving internal crystalline-structure processing of substrate material.
Figure 9:
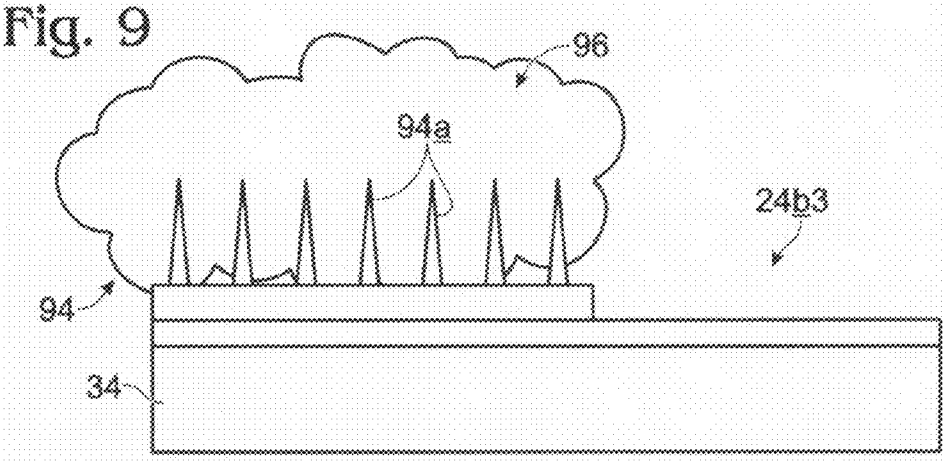
FIG. 9 provides a simplified side elevation of the structure presented in FIG. 8, schematically picturing, also, a non-uniform electrical field.

As can be seen in FIGS. 8 and 9, the structure suggested herein for the creation of a non-uniform electrical field takes the form of a sub-array of very slender, approximately equal-height micro-spikes, such as those shown at 94*a* in FIG. 9, with regard to which electrical energization, as by a computer, such as computer 40, results in the production of an appropriate non-uniform electrical field, shown generally and very schematically in a cloud-like fashion at 96 in FIG. 9.

Figure 10A:
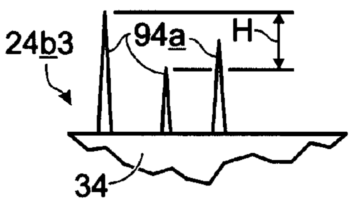
FIGS. 10A, 10B and 10C illustrate, in greatly simplified forms, three different kinds of three-dimensional spike features which may be created in relation to what is shown generally in FIGS. 8 and 9 for the production of a non-uniform electrical field.
Figure 10B:
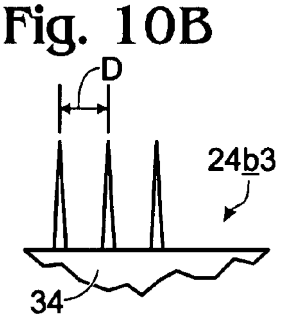
Figure 10C:
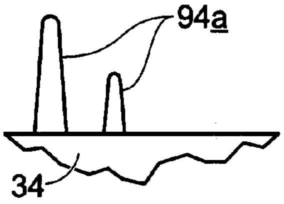

FIGS. 10A, 10B and 10C illustrate several, different, representative micro-spike configurations and arrangements which might be used to characterize a non-uniform electrical field-creating subcomponent. Such micro-spikes are simply illustrative of one of various kinds of different, electronically (computer) switchable structures which may be created within a field-creating structure in a pixel to develop, when energized, a suitable, non-uniform electrical field.

FIG. 10A illustrates modified micro-spike structures 94*a* regarding which distributed micro-spikes may have, either uniformly, or differentially, different heights lying within a user-selectable height range generally indicated at H.

FIG. 10B illustrates an arrangement wherein micro-spikes 94*a* are configured like those shown in FIGS. 8 and 9, except for the fact that these FIG. 10B micro-spikes are more densely organized, as indicated by next-adjacent, interspike distance D. Such an interspike distance is freely chooseable by a user, and need not be uniform throughout a full sub-array of micro-spikes.

What is illustrated in FIG. 10C is an arrangement wherein the pictured micro-spikes 94*a* may have several differentiating characteristics, such as differentiating heights and sharpnesses (i.e., pointednesses).

Those skilled in the art will understand that the specific configuration of a non-uniform-electrical-field-creating subcomponent utilizing spikes, such as those just discussed, may be created in any one of a number of different ways.

Figure 11:
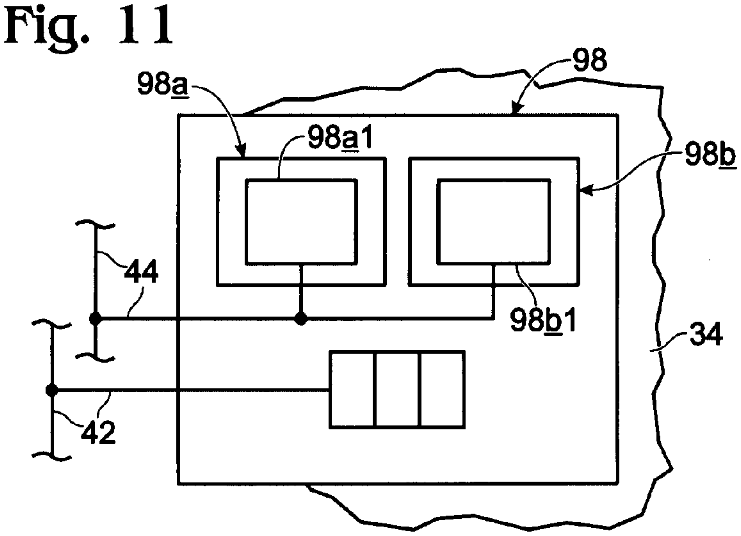
FIG. 11 provides a fragmentary view, somewhat like that presented in FIG. 1, but here showing a pixel which has been created in accordance with practice of the present invention to include two (plural) assay sensors, each of which hosts a single, fluid-material assay site.
Figure 12:
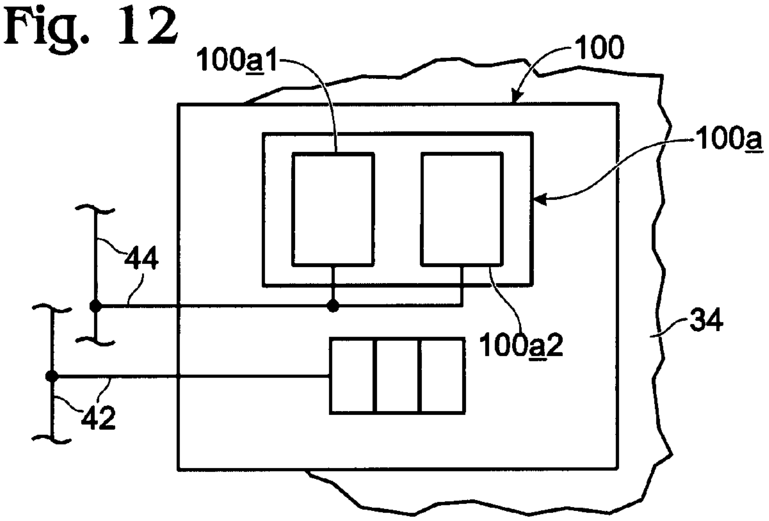
FIG. 12 is somewhat similar to FIG. 11, except that this figure shows a pixel which has been prepared in accordance with practice of the present invention to include a single fluid-assay sensor which possesses, or hosts, two (plural) fluid-material assay sites.

Addressing attention now to FIGS. 11 and 12, what is shown in FIG. 11 is a modified fragmentary region drawn from the fragmentary illustration of FIG. 1. This figure specifically illustrates a pixel 98 possessing two assay sensors 98*a*, 98*b*, each of which hosts but a single prospective assay site 98$a_1$, 98$b_1$, respectively.

The modification illustrated in FIG. 12 shows an arrangement wherein a pixel 100 which possesses a single sensor 100*a* is structured so as to host two, different, potential assay sites 100$a_1$ and 100$a_2$.

Thus, according to the present invention which is now fully described, a unique, pixelated active matrix, useable ultimately in a fluid-material assay, has been illustrated and described. This matrix has a structure wherein each pixel in that matrix is originally individually and independently functionalizable to display an affinity for at least one specific fluid-assay material, and following such functionalization, and the subsequent performance of a relevant assay, individually and independently digitally readable to assess assay results. Independent digital addressability of each pixel introduces interesting opportunities (not offered by prior art structures) for conducting fluid-material assays in many new ways, including ways that include examining assay results on kinetic and time-based axes of information. Depending upon how initial pixel functionalization has been done, a single matrix may be employed in one-to-many fluid-material assays.

Under circumstances where a submatrix functionalization approach has been used to characterize a user-received overall matrix made in accordance with the present invention, that approach enables either (a) several, successive, same-assay-material, matrix-assay uses to take place with respect to the same, single, overall matrix, or (b) several, successive, different-assay-material, matrix-assay uses to occur also with respect to the same, single, overall matrix. It will also be apparent that the use of a submatrix functionalization approach with respect to the matrix structure of the present invention enables a user to perform selected assays at different pixel-distribution "granularities".

The matrix structure of the invention preferably utilizes a low-cost substrate material, such as glass or plastic, and features the low-temperature fabrication on such a substrate of supported pixel structures, including certain kinds of special internal components or substructures, all formed preferably by low-temperature TFT and Si technology as discussed above.

Accordingly, while a preferred and best mode embodiment of the invention, and certain modifications thereof, have been illustrated and described herein, additional variations and modifications may also be made which will come within proper spirit and scope of the invention.

We claim:

1. An active-matrix, fluid-assay micro-structure comprising a substrate having a surface, plural, TFT-technology-fabricated pixels all formed in common on, and only on, said surface, and within each pixel, an assay site which has been affinity-functionalized to respond to a selected, specific fluid-assay material, and, disposed operatively and laterally adjacent said site, and also formed by TFT-fabrication technology, (1) a control transistor, and (2) a light-field-creating optical medium operatively connected to, and energizable by operation of, said transistor, said optical medium being structured, when energized by operation of said transistor, (a) to create from, and adjacent, its location on said surface, and (b) to bathe said assay site with an ambient light field which is operable to assist in the reading out of an assay-result response from the assay site.

2. The micro-structure of claim 1, wherein at least certain ones of said pixels are constructed each to include plural, differently-affinity-functionalized assay sites.

3. The micro-structure of claim 1, wherein said affinity-functionalized assay site possesses a DNA oligonucleotide probe.

* * * * *

UNITED STATES PATENT AND TRADEMARK OFFICE

CERTIFICATE OF CORRECTION

PATENT NO. : 8,231,831 B2
APPLICATION NO. : 11/827174
DATED : July 31, 2012
INVENTOR(S) : John W. Hartzell et al.

It is certified that error appears in the above-identified patent and that said Letters Patent is hereby corrected as shown below:

Column 12, line 11, “site with” should read --site and said probe with,--.

Signed and Sealed this
Eighteenth Day of September, 2012

David J. Kappos

David J. Kappos
*Director of the United States Patent and Trademark Office*